Aug. 28, 1951 W. S. PAJES 2,565,514
RADIATION INTENSITY MODULATOR
Filed Dec. 1, 1947

INVENTOR.
WOLF SZMUL PAJES
BY
Robert Harding Jr.
ATTORNEY

Patented Aug. 28, 1951

2,565,514

UNITED STATES PATENT OFFICE 2,565,514

RADIATION INTENSITY MODULATOR

Wolf Szmul Pajes, New York, N. Y., assignor to International Standard Electric Corporation, New York, N. Y., a corporation of Delaware Application December 1, 1947, Serial No. 789,116

2 Claims. (Cl. 88—61)

This invention relates to a method of and means for varying the intensity of light waves.

An object of the invention is to provide a novel method of varying the intensity of visible or invisible radiation by means of electrical modulating potentials.

Another object of the invention is to provide an arrangement for converting piezo-electrical oscillations of a crystal into intensity modulation of a light beam.

Various methods are known for modulating the intensity of a light ray. These methods include the rotation of the plane of polarization under the influence of electric or magnetic fields, the change of surface tension of a liquid under the pressure of electric charges to vary the refractive power of the liquid, the use of supersonic cells to vary the intensity of a diffraction pattern in proportion to the intensity of sound waves resulting from the application of an electrical signal, the use of mechanical shutters or reflectors subjected to electric or magnetic excitation to produce mechanical vibrations, and so on.

The present invention differs from all these known methods. One of its features is the transmission of a light ray through a combination of two transparent media separated by a third medium having a thickness which is small compared with the wavelength of the transmitted light. The optical density of the third medium being below a determined critical value relative to that of the first medium, partial reflection will occur to a degree which is dependent upon the thickness of the third medium, and means is accordingly provided for varying the said thickness whereby the intensity of the reflected and of the transmitted ray may be modulated.

Other features and objects of the invention will become apparent as the description proceeds, reference being had to the accompanying drawing in which.

It is well known that, at the interface between two media of different optical density, total reflection will occur if the sine of the angle of incidence is greater than $N_2/N_1$, $N_1$ and $N_2$ being the respective refractive indices of the two media. If, however, the second medium (of refractive index $N_2$) is a very thin layer the thickness of which is but a fraction of the wavelength of the incident ray, total reflection does not take place but part of the ray will continue through the second medium without any change in direction. If a third medium follows the second medium, the portion of the ray transmitted by the second medium will be refracted in the third medium according to the relative index of refraction of the first and the third medium. The percentage of transmitted and reflected energy will in any case be determined by the thickness of the low-density layer.

Figure 1:
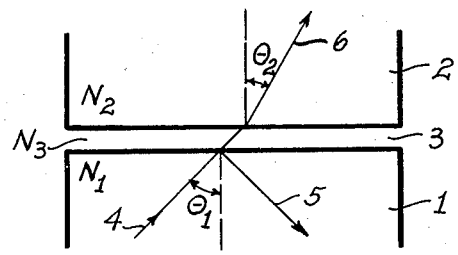
Fig. 1 is a diagram used to illustrate the principles underlying the present invention.

These conditions are illustrated in Fig. 1 which shows, schematically, two transparent media 1 and 2 of relatively high refractive indices $N_1$, $N_2$, respectively, the two media being separated by an air gap 3 which forms a third medium of relatively low refractive index $N_3$. Disregarding for the moment the slot 3, we can establish the relationship between the angle of incidence $\theta_1$ and the angle of refraction $\theta_2$, according to Snell's law, by the formula $\sin\theta_1/\sin\theta_2 = N_2/N_1$. With $\theta_1$ fixed, the angle $\theta_2$ will not be affected by the presence of the slot 3, as stated above, but the incident ray 4 will be divided into a reflected ray 5 and a transmitted ray 6, the magnitude of the former increasing and that of the latter decreasing with growing width of the slot.

Figure 2:
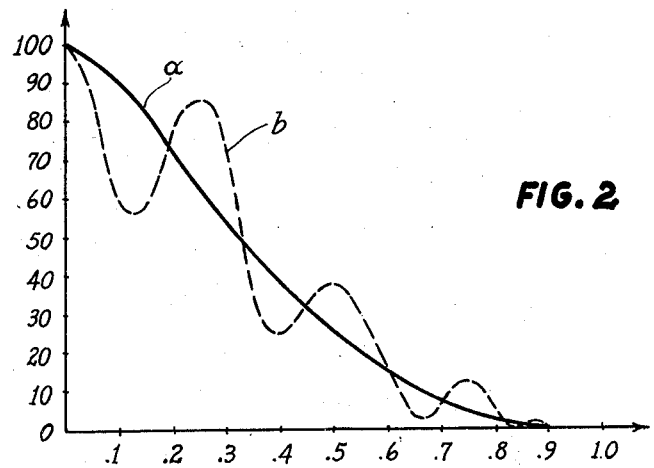
Fig. 2 is a graph illustrating the transmission characteristics of an arrangement according to the invention.

The relationship between slot width and percentage of energy transmitted across the medium 3 is illustrated in Fig. 2. In this figure, the percentage of transmission is represented by the ordinates whereas the abscissae give the ratio of slot width to wavelength. Curve $a$ represents the case in which the low-density medium is air or vacuum, having a dielectric constant of unity. For greater dielectric constants the curve may assume the form shown at $b$ wherein the intensity of the transmitted light goes through several maxima and minima, with the mean intensity decreasing toward zero as the width of the layer approaches a full wavelength.

Figure 3:
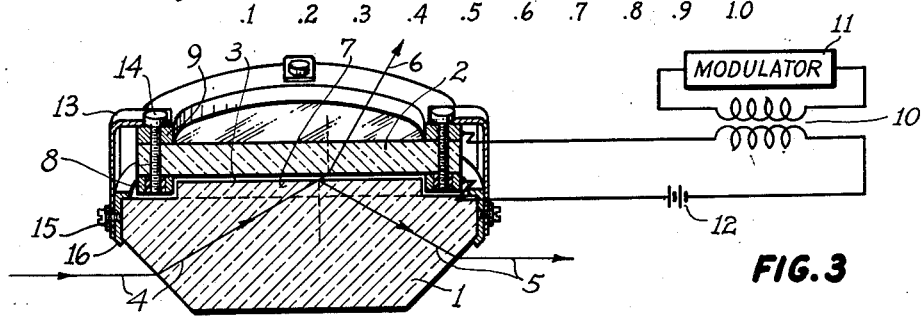
Figs. 3 and 4 are two forms of realization of the invention.

Fig. 3 shows a possible arrangement for carrying the invention into practice. The medium 1 is a piece of glass, of generally frusto-conical shape, while the medium 2 is a piezo-electric element such as quartz, cut in the form of a disc. An air space 3 is provided between the underside of the disc 2 and the exposed surface of a shoulder portion 7 formed on the piece 1. The shoulder 7 is surrounded by an annular electrode 8 which, together with a similar electrode 9, brackets the disc 2, the two electrodes serving for the application of an alternating potential to the quartz which will result in the well-known effect of electrostriction. For this purpose the electrodes 8 and 9 are connected, over a transformer 10, to a modulator 11 which impresses upon them a modulating potential varying in accordance with the intelligence to be transmitted. The application of the modulating potential to the electrodes 8, 9 will result in alternate contractions and expansions of the disc 2 whereby the dimensions of the air gap 3 will be correspondingly varied, causing in turn a change in the proportions of the reflected and the transmitted ray 5 and 6.

In order to preclude any tendency to frequency doubling, a suitable biasing potential may be applied to the electrodes 8 and 9 from a source of direct current shown as a battery 12. This is analogous to the provision of a permanent magnet in telephone receivers.

It will be noted that both the incident and the reflected ray 4 and 5 are refracted on entering and leaving, respectively, the medium 1, the final direction of ray 5 corresponding to the original direction of ray 4. It may thus be convenient, in some cases, to utilize the reflected beam 5 rather than the transmitted beam 6 as a carrier of intelligence, the intensity of the two beams varying in inverse relationship. In any case it will be necessary to select the initial width of the air gap 3 so that a suitable operating point on the characteristic curve $a$ of Fig. 2 is obtained.

The annular electrodes 8 and 9 are designed so that the disc 2 should be able to vibrate in piston-like fashion, that is the underside of the disc should oscillate with equal amplitude over its entire surface. For this purpose the lower electrode 8 is not supported directly on the glass piece 1 but means such as brackets 13, secured to the upper electrode 9 by bolts 14 and to the base 1 by screws 15 engaging a sleeve 16, may be provided to insure the desired spacing between the two transparent media.

Figure 4:
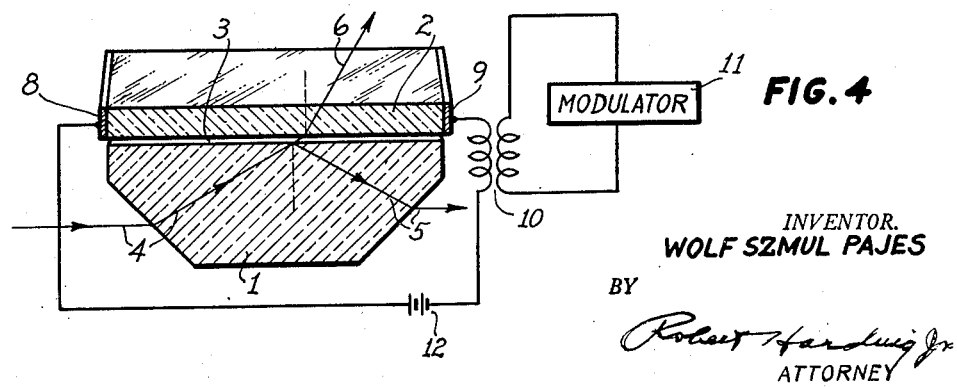

In Fig. 4, in which corresponding elements have been given the same reference characters as in Fig. 3, the members 1 and 2 are of rectangular rather than circular shape and the quartz is end-modulated by means of electrodes 8 and 9, suitable means (not shown) serving to secure the crystal 2 to the glass base 1 with the desired amount of spacing. With this arrangement the width of the air space 3 will vary as the quartz oscillates in thickness, yet it should be borne in mind that this oscillation may not be uniform throughout its area, hence the depth of modulation may be different for different points of the gap.

Finally it will be appreciated that satisfactory performance of an arrangement such as shown in Fig. 3 or 4 will be obtainable only for a relatively narrow band of wavelengths centered upon that wavelength for which the gap 3 has been critically adjusted. The beam 4 should therefore be of monochrome character and, if a source of polychrome light is to be used, the radiation from that source should be decomposed into its several components, to be modulated in synchronism by individual assemblies adjusted to the respective wavelengths thereof.

It is to be understood that the specific embodiments shown and described have been given merely by way of illustration and not as a limitation upon the scope of the invention as defined in the objects and in the appended claims. Also, the term "light" as used in the claims is intended to include both the visible and the invisible portions of the spectrum.

What is claimed is:

1. An arrangement for modulating a beam of light comprising two transparent media, means for maintaining said two media in spaced relationship to provide an air gap between them, the width of said gap being less than the wavelength of the said light beam, means for directing said beam through said two transparent media at such an angle that partial reflection at the air gap will occur, and means for varying the spacing between said two media in accordance with the modulation desired, one of said transparent media comprising a piezo-electric element and said last means comprising a set of electrodes in contact with said element, a source of modulating potential and means for applying said modulating potential to said electrodes whereby the dimensions of said piezo-electric element and, hence, the spacing thereof from the other transparent medium will be varied.

2. An arrangement according to claim 1, further comprising means for applying a unidirectional bias potential to said electrodes whereby frequency doubling will be prevented.

WOLF SZMUL PAJES.

REFERENCES CITED

The following references are of record in the file of this patent:

UNITED STATES PATENTS

| Number | Name | Date |
| --- | --- | --- |
| 1,044,502 | Crehore | Nov. 19, 1912 |
| 2,000,379 | Deisch | May 7, 1935 |
| 2,000,380 | Deisch | May 7, 1935 |
| 2,455,763 | Harrison | Dec. 7, 1948 |

FOREIGN PATENTS

| Number | Country | Date |
| --- | --- | --- |
| 342,219 | Great Britain | Jan. 29, 1931 |